US00RE37849E

(19) United States
(12) Reissued Patent
Pokorny

(10) Patent Number: US RE37,849 E
(45) Date of Reissued Patent: Sep. 17, 2002

(54) AQUEOUS BASED COMPOSITION CONTAINING DIBASIC ESTER AND THICKENING AGENT FOR REMOVING COATINGS

(75) Inventor: Richard J. Pokorny, Maplewood, MN (US)

(73) Assignee: 3M Innovative Properties Company, St. Paul, MN (US)

(21) Appl. No.: 07/908,650

(22) Filed: Jul. 2, 1992

Related U.S. Patent Documents

Reissue of:
(64) Patent No.: 4,927,556
Issued: May 22, 1990
Appl. No.: 07/260,172
Filed: Oct. 20, 1988

U.S. Applications:

(63) Continuation of application No. 07/694,448, filed on May 1, 1991, now abandoned, which is a continuation-in-part of application No. 07/164,231, filed on Mar. 18, 1988, now abandoned, which is a continuation-in-part of application No. 07/058,162, filed on Jun. 4, 1987, now abandoned.

(51) Int. Cl.[7] ..... C11D 7/26
(52) U.S. Cl. ..... 510/206; 510/417; 510/505; 134/38
(58) Field of Search ..... 252/170, 171, 252/DIG. 8, 172, 173; 134/38; 510/206, 417, 505

(56) References Cited

U.S. PATENT DOCUMENTS

| | | | | |
|---|---|---|---|---|
| 3,615,825 A | | 10/1971 | Gansser | 134/38 |
| 3,681,250 A | | 8/1972 | Murphy | 252/158 |
| 3,702,304 A | | 11/1972 | Esposito | 251/171 |
| 3,925,231 A | | 12/1975 | Ritzi | 252/171 |
| 3,972,839 A | | 8/1976 | Murphy | 252/548 |
| 4,120,810 A | | 10/1978 | Palmer | 252/153 |
| 4,445,939 A | | 5/1984 | Hodson | 134/2 |
| 4,508,634 A | | 4/1985 | Elepano et al. | 252/153 |
| 4,617,251 A | * | 10/1986 | Sizensky | 430/256 |
| 4,673,524 A | * | 6/1987 | Dean | 252/118 |
| 4,680,133 A | | 7/1987 | Ward | 252/153 |
| 4,780,235 A | | 10/1988 | Jackson | 252/170 |

FOREIGN PATENT DOCUMENTS

| | | |
|---|---|---|
| DE | 34 38 399 | 3/1986 |
| JP | 57-83598 | 5/1982 |

OTHER PUBLICATIONS

Jackson, H.L., Industrial Finishing, Mar. 1984, 27–30.

Dialog WPI Abstract #87–114031/16, for RD 275071, Dupont de Nemours(4) Co., Mar. 10, 1987.*

*Solvent Formulations for Industrial Finishes*, H. L. Jackson, Industrial Finishing, Mar. 1984, pp. 27–30.*

* cited by examiner

*Primary Examiner*—Douglas J. McGinty
(74) *Attorney, Agent, or Firm*—David B. Patchett

(57) ABSTRACT

Composition for removing coatings from surfaces consisting essentially of at least one dibasic ester, water, and at least one thickening agent. The composition contains sufficient water and thickening agent to allow it to wet out and adhere to vertical surfaces for a sufficiently long period to insure that the dibasic ester component will have sufficient duration of contact with the coating to allow easy removal of same.

12 Claims, 1 Drawing Sheet

AQUEOUS BASED COMPOSITION CONTAINING DIBASIC ESTER AND THICKENING AGENT FOR REMOVING COATINGS

Matter enclosed in heavy brackets [ ] appears in the original patent but forms no part of this reissue specification; matter printed in italics indicates the additions made by reissue.

BACKGROUND OF THE INVENTION

This application is a continuation-in-part of U.S. Ser. No. 164,231, filed Mar. 18, 1988, now abonadoned, which is a continuation-in-part of U.S. Ser. No. 58,162, filed June 4, 1987, now abandoned.

DESCRIPTION OF THE PRIOR ART

This invention relates to compositions for removing coatings from surfaces.

Compositions for removing paints, varnishes, and other coatings have been available for many years. Most of these compositions fall within two general classes. The first type attacks the coating by the chemical action of the ingredients thereof, which generally comprise alkalis or acids. This type of paint remover comprises alkali and acid compositions, such as those described in U.S. Pat. Nos. 3,681,250, 3,615,825 and 3,972,839. [There]*These* alkali or acid compositions require considerable after treatment to insure complete removal of the alkali or acid, and have been found to discolor wood. The second type depends upon the solvent power of the constituents of the composition to dissolve or at least soften the coatings. In the second type, it is customary to use aromatic hydrocarbons, lower aliphatic esters, ketones, alcohols, chlorinated solvents, or similar organic solvents. However, the vapor pressure of such liquids is high, with the result that it difficult to keep the paint or lacquer surface wet with the liquid solvent. It has been proposed to overcome this difficulty by adding paraffin wax to such liquid organic solvents to reduce their evaporation rate and thus prolong their contact with the coating to be removed, so that the coating may be sufficiently softened to allow it to be scraped off easily. However, the paraffin wax must be removed in a subsequent step. Although these solvents have received wide usage and have been found to have acceptable stripping qualities, their use is being questioned on the grounds of the health and safety hazards they present to the environment and to the users thereof. U.S. Pat. No. 4,120,810discloses the use of N-methyl 2-pyrrolidone and a mixture of aromatic hydrocarbons having more than six carbon atoms as a paint stripper effective on a wide range of surfaces and capable of penetrating more layers of paint per application primarily because of its slow evaporation rate. This material suffers from the high cost of raw materials and the suspected toxic effects of the aromatic materials used.

U.S. Pat. No. 4,508,634 discloses a composition for removing paint, grease, dirt, and other foreign materials from the skin. The composition comprises propylene carbonate, water, at least one organic cosolvent, at least one thickening agent, at least one neutralizing agent, and at least one surfactant. Although this composition is effective, it has a shelf life that does not generally exceed six months. This limited shelf life is due to the presence of propylene carbonate.

SUMMARY OF THE INVENTION

This invention provides an aqueous-based, low-toxicity, non-flammable, thixotropic composition for rendering coatings removable from surfaces.

The composition is an emulsion consisting essentially of (1) at least one dibasic esters, preferably selected from the group consisting of dibasic esters of adipic, glutaric, and succinic acids, (2) water, and (3) at least one thickening agent selected from the group consisting of water soluble and water swellable thickening agents, and mixtures thereof. The amount of dibasic ester or esters in the composition must be sufficient to effectively remove coatings from surface. The amount of thickening agent or agents in the composition must be sufficient to allow the dibasic ester component and water to form a stable emulsion. The composition contains sufficient water to cause the mixture to wet out and adhere to vertical surfaces for a sufficiently long period to insure that the dibasic ester will have sufficient duration of contact with the coating or finish to allow removal of same. The emulsion must contain at least 55% by weight water, preferably at least 60% by weight water, and more preferably at least 70% by weight water.

The composition is effective on a wide range of coatings and surfaces. The composition is useful for rendering organic polymeric coatings and finishes such as paints, varnishes, lacquers, shellacs, gums, natural and synthetic resins removable from such surfaces as wood, metal, and plastic. The composition has also been found to be effective for removing paints, inks, grease, and the like from skin. An important feature of the composition is that it provides excellent results without the need of evaporation retardants or film-forming compounds. Thus, there is no need to include in the formulation such evaporation retardants, as paraffin wax or the like, which have the disadvantage that they need to be removed in subsequent steps. Another feature of the composition is that it has a shelf life in excess of one year.

DETAILED DESCRIPTION

Figure 1:
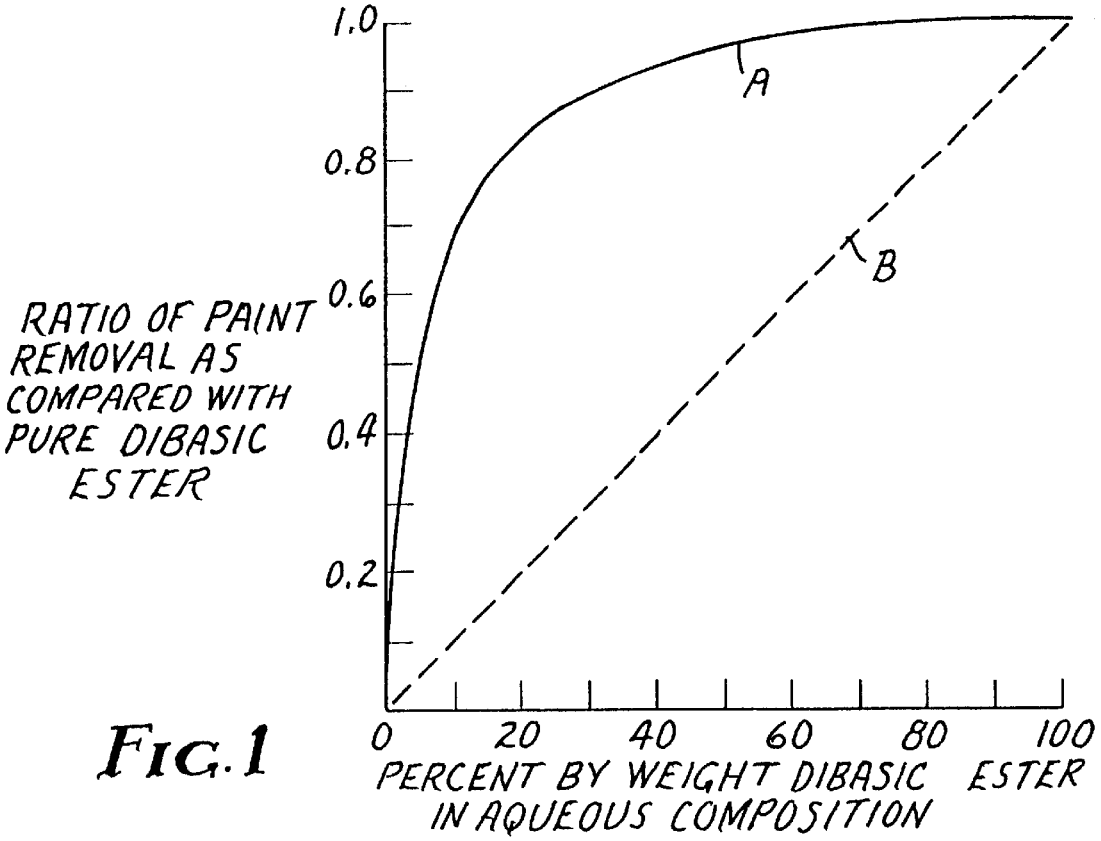
FIG. 1 is a graph that compares actual rate of paint removal to expected rate of paint removal for various concentrations of aqueous dibasic ester emulsions.

The composition of the invention consists essentially of water, at least one dibasic ester, and at least one water soluble thickening agent. By combining the dibasic ester or esters with water and a small amount of thickening agent, the emulsion formed thereby remains stable and the effectiveness of the dibasic ester or esters as a solvent is only slightly reduced from what it would have been if the ester or esters had not been diluted with water.

Dibasic esters are the active ingredient in the composition of the present invention. It is the dissolving property of dibasic esters that is essential for removal of paint and other coatings. Generally, dibasic esters that can be used in the composition of this invention include aliphatic diesters having a molecular weight of up to about 200. More than one dibasic ester can be used in the compositions of this invention. These diesters are well-known in the art and are commercially available. Commercially available diesters that are suitable for the present invention are the DuPont Dibasic Esters (DBEs), available from E. I. du Pont *de* Nemours and Co. Dibasic esters that are preferred for the composition of the present invention are esters derived from adipic acid ($COOH(CH_2)_4COOH$), glutaric acid ($COOH(CH_2)_3COOH$), and succinic acid ($COOH(CH_2)_2COOH$). Two of the esters of these acids can be employed in the composition of this invention, and even all three of the esters of these acids can be employed in the composition of this invention. Both dimethyl esters and diethyl esters of these acids can be used effectively in the composition of this invention.

The purpose of the water is to aid the dibasic ester in wetting out and adhering to surfaces, particularly vertical surfaces, in order to allow the dibasic ester to soften the coating on the surface. The composition must contain at least 55% by weight water, preferably at least 60% by weight water, and more preferably at least 70% by weight water. If less than 55% by weight water is employed, the composition tends to be unstable, i.e., the dibasic ester tends to separate out of the ester/water emulsion and is unable to be re-emulsified.

The purpose of the thickening agent or agents is to stabilize the ester/water emulsion and provide good flow control, i.e. the presence of thickening agent allows the composition to be applied easily, level out, and have the ability to cling to vertical surfaces. The thickening agent must be soluble in water or swellable in water and must be capable of promoting formation of a stable emulsion of the composition of this invention. Thickening agents that are preferred for the composition of the present invention include gums, e.g. xanthan, guar, locust bean, alginates, polyvinyl alcohol, polyacrylates, starches, clay derivatives, e.g. amine treated magnesium aluminum silicate, and cellulose derivatives, e.g. hydroxypropyl methylcellulose. The thickening agents that are most preferred are the clay derivatives, cellulose derivatives, and xanthan gum.

It is preferred, but not necessary, to include surfactants in the composition of the present invention in order to stabilize the emulsion and aid in wetting out oil-based paints. Surfactants that are useful in the composition of the present invention include nonionic and anionic surfactant having an HLB value of at least 10.

Other additives that are useful in the composition of the present invention include polar co-solvents such as N-methyl pyrrolidone or benzyl alcohol, and [abrassive] *abrasive* particles such as aluminum oxide, silicon carbide, pumice.

The amount of dibasic ester or esters must be sufficient to insure effective removal of coatings from surfaces. The amount of thickening agent or agents must be sufficient to allow the water and dibasic ester component to form a stable emulsion. The amount of water can vary and is essentially the difference between the total amount of the composition and the amount of dibasic ester component, thickening agent component, and surfactant component.

The concentration of water in the composition can range from about 55% by weight to about 90% by weight and the concentration of dibasic esters can range from about 10% by weight to about 45% by weight, preferably from about 10% by weight to about 40% by weight, more preferably from about 10% by weight to about 35% by weight. The amount of thickening agent can range from about 0.5% by weight to about 4.0% [be] *by* weight. The composition can also contain up to 2.0% by weight surfactant. As stated previously, the composition must contain at least 55% by weight of water.

The composition of this invention can be prepared by first adding thickening agents and other additives to water, then adding surfactant, if desired, and dibasic ester or esters to the resulting [mixtures] *mixture*. The mixture can than be mixed vigorously in order to form an emulsion.

While the dibasic esters are known to be capable of removing paint by themselves, their low viscosities render them unsuitable for use on vertical surfaces. They tend to run off the surface before they are able to soften the coating to be removed. The presence of water and thickening agent renders the total composition capable of wetting out and adhering to vertical surfaces for a period of time sufficient to bring about softening of paint coatings. Yet, the presence of water and thickening agent does not reduce the [efficacy] *efficiency* of the dibasic esters as a paint remover. This is in contrast to a known use of the dibasic ester solvent as a coalescing agent in latex compositions (see "Solvent Formulations for Industrial Finishes", Industrial Finishing, March, 1984, p. 27–[20]29). Furthermore, the presence of water allows the expensive dibasic esters to be used as a paint remover.

The composition of this invention can also be used as a skin cleaner for removal of such materials as paints, varnishes, stains, inks, grease, etc.

In order to enhance the cleaning properties of the composition, a nonwoven material, such as a Buf Puf ® cleaning pad or one of the Brushlon ® abrasive products such as the Scrubteam ® brush or the short trim Brushlon ® brush, can be used to abrade the coatings to be removed.

The shelf life of the composition of this invention has been found to be in excess of one year.

The following examples are set forth to illustrate this invention and are not intended to limit the scope thereof.

EXAMPLE 1

The following ingredients in the amounts indicated were used to prepare a composition of this invention:

| Ingredient | Amount (parts by weight) |
|---|---|
| Clay thickening agent (amine treated magnesium aluminum silicate, "Veegum Pro", available from R. T. Vanderbilt Co., Inc., Norwalk, CT) | 0.8 |
| Cellulose thickening agent (hydroxypropyl methylcellulose, "Methocel K15MS", available from Dow Chemical Co., Midland, MI) | 1.0 |
| Surfactant (polypropylene oxide-polyethylene oxide copolymer, "Pluronic P104", available from BASF Wyandotte Corp. Wyandotte, MI) | 0.05 |
| Dibasic ester (DBE-3, a mixture containing 89% dimethyl adipate, 10% dimethyl glutarate, 0.5% dimethyl succinate, 0.1% methanol, available from E. I. du Pont de Nemours and Co., Wilmington, DE) | 24.5 |
| Water | 73.65 |

The clay thickening agent was added to the water and the mixture stirred at a constant rate at 78° C. for 30 minutes. The cellulose thickener was then added with stirring and the resulting mixture was stirred for an additional 10 minutes. The surfactant was then added along with the dibasic ester. The mixture was then cooled to 50° C. and then poured into a closed container. The mixture was allowed to cool to room temperature before being tested on painted surfaces.

The composition was used to remove the following coatings:

20 year old latex paint
very old varnish
nitrocellulose lacquer
new latex paint clear varnish

*polyurethane varnish* baked oil enamel

All of these coatings were softened by the composition and could be removed in one hour or less. Removal of multiple coatings of baked oil enamels required approximately three hours.

EXAMPLES 2–7

The following table sets forth ingredients and the amounts thereof used to prepare compositions within the scope of this invention. The compositions were prepared in the same manner as in Example 1, with the exception that xanthan gum was added at the same time as the cellulose thickener.

TABLE I

| Ingredient | Amount (parts by weight) 2 | 3 | 4 | 5 | 6 | 7 | Control A | Control B |
|---|---|---|---|---|---|---|---|---|
| Clay thickening agent[1] | 0.27 | 0.25 | 0.25 | 0.25 | 0.25 | 0.20 | — | — |
| Clay thickening agent[2] | — | — | — | — | — | — | 1.0 | — |
| Cellulose thickening agent[3] | 0.65 | 0.58 | 0.59 | 0.59 | 0.5 | 0.49 | 1.0 | — |
| Xanthan gum[4] | 0.92 | 0.82 | 0.79 | 0.79 | 0.79 | 0.69 | — | — |
| Dibasic ester[5] | 9.8 | 19.7 | — | — | — | 4.9 | — | — |
| Dibasic ester[6] | — | — | 24.6 | — | — | — | — | 100 |
| Dibasic ester[7] | — | — | — | 24.6 | — | — | — | — |
| Dibasic ester[8] | — | — | — | — | 24.6 | — | — | — |
| Surfactant[9] | 0.1 | 0.1 | 0.1 | 0.1 | 0.1 | 0.1 | 0.07 | — |
| Water | 88.26 | 78.55 | 73.67 | 73.67 | 73.67 | 93.62 | 97.93 | — |

[1]Colloidal magnesium aluminum silicate, "Veegum T", available from R. T. Vanderbilt Co., Inc.
[2]Amine treated magnesium aluminum silicate, "Veegum Pro", available from R. T. Vanderbilt Co., Inc.
[3]Hydroxypropyl methylcellulose, "Methocel K15MS", available from Dow Chemical Co.
[4]"Rhodopol 23", available from R. T. Vanderbilt Co., Inc.
[5]DBE-3, a mixture containing 89% dimethyl adipate, 10% dimethyl glutarate, 0.5% dimethyl succinate, 0.1% methanol, available from E. I. du Pont de Nemours and Co.
[6]DBE, a mixture containing 17% dimethyl adipate, 66% dimethyl glutarate, 16.5% dimethyl succinate, 0.2% methanol, available from E. I. du Pont de Nemours and Co.
[7]DBE-4, a mixture containing 99.5% dimethyl succinate, 0.1% methanol, available from E. I. du Pont de Nemours and Co.
[8]DBE-9, a mixture containing 1.5% dimethyl adipate, 73% dimethyl glutarate, 25% dimethyl succinate, 0.3% methanol, available from E. I. du Pont de Nemours and Co.
[9]Polypropylene oxide-polyethylene oxide copolymer, "Pluronic P104", available from BASF Wyandotte, Corp.

COMPARATIVE EXAMPLE A

A commercially available paint stripper ("Zip-Strip Paint and Varnish Remover", non-flammable, available from the Star Bronze Company of Alliance, OH) was prepared by combining the following ingredients, in the amounts indicated, in order, followed by mixing after each addition.

| Ingredient | Amount (parts by weight) |
|---|---|
| Methylene chloride | 67.0 |
| Ethyl alcohol | 5.0 |
| Mineral spirits | 23.0 |
| Methyl alcohol | 3.0 |
| Paraffin wax/methyl cellulose | 2.0 |

COMPARATIVE EXAMPLE B

A paint stripper described in DE 3438399 was prepared by combining the following ingredients, in the amounts indicated, followed by mixing after each addition.

| Ingredient | Amount (parts by weight) |
|---|---|
| Diethylene glycol monobutyl ester | 12.0 |
| Dimethyl ester of succinic acid | 15.0 |
| Dimethyl ester of glutaric acid | 45.0 |
| Dimethyl ester of adipic acid | 6.0 |
| Cellulose acetobutyrate | 2.0 |
| Alkyl benzene sulfonate | 5.0 |
| Sodium oleate | 10.0 |
| Water | 5.0 |

A circle of each composition, one centimeter in diameter, was applied to a pine board, resting in a horizontal position, which had been coated with four layers of baked oil enamel paint. After 2½ hours, the compositions were wiped off, and the paint was scraped. Each layer of paint was 0.0381 milimeters in thickness All samples were tested on the same panel in close proximity of each other. The number of layers of paint removed was recorded. The average of three trials is recorded as the rating of the effectiveness of the composition.

TABLE II

| Example No. | Paint Removal Rating |
|---|---|
| 1 | 2.0 |
| 2 | 2.1 |
| 3 | 2.0 |
| 4 | 2.0 |
| 5 | 2.2 |
| 6 | 1.9 |
| 7 | 1.8 |
| Control A | 0.0 |
| Control B | 2.7 |
| Comparative A | 4.0 |
| Comparative B | 2.2 |

The foregoing test was repeated, the only exception being that the pine board was disposed in a vertical position. All examples demonstrated a rating of at least 2.0 except for example no. 8, which demonstrated a rating of 1.5. Controls A and B both demonstrated ratings of zero (0). These tests clearly show pure dibasic ester is not a useful paint remover for painted vertical surfaces.

FIG. 1 shows that when dibasic ester is diluted with water (line A), paint removal rate exceeds the expected paint removal rate (line B).

Figure 2:
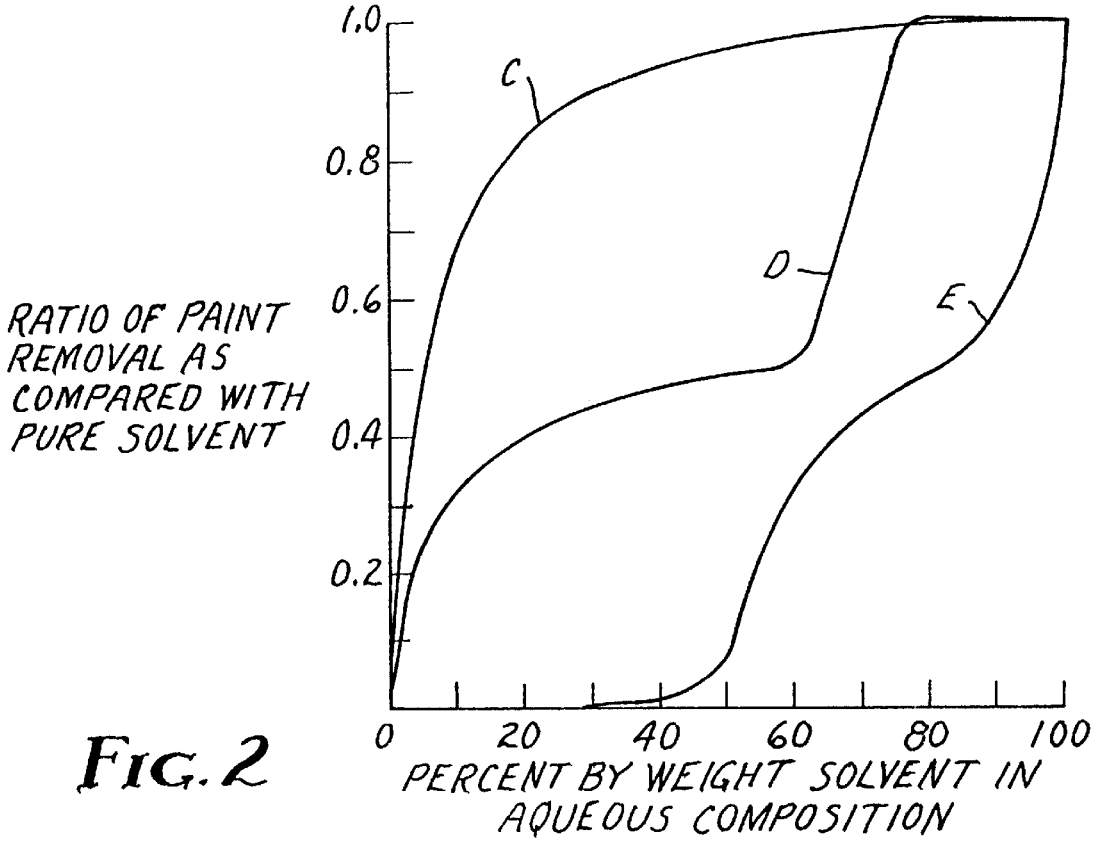
FIG. 2 is a graph that compares relative rate of paint removal for various aqueous solvent mixtures.

FIG. 2 shows that at equivalent concentrations, aqueous dibasic ester emulsions (line C) exhibit higher relative paint removal rate than aqueous mixtures of methylene chloride (line D) or n-methyl 2-pyrrolidone (line E).

EXAMPLES 8–15

The following table sets forth ingredients and the amounts thereof used to prepare compositions within the scope of this invention. The compositions were prepared in the same manner as in Example 1.

TABLE III

| Ingredient | Amount (parts by weight) | | | | | | | |
|---|---|---|---|---|---|---|---|---|
| | 8 | 9 | 10 | 11 | 12 | 13 | 14 | 15 |
| Clay thickening agent[1] | 1.65 | 2.16 | 2.16 | 2.16 | 2.16 | 2.16 | 2.16 | 2.16 |
| Surfactant[2] | 0.9 | .144 | 0.9 | 0.9 | .144 | .144 | .144 | .144 |
| Surfactant[3] | 1.1 | .176 | 1.1 | 1.1 | .176 | .176 | .176 | .176 |
| Dibasic ester[4] | 40.3 | 41.0 | 39.32 | 34.3 | 31.0 | 24.00 | 16.12 | 6.12 |
| Xanthan gum[5] | 0.39 | 0.5 | 0.5 | 0.5 | 0.5 | 0.5 | 0.5 | 0.5 |
| Cellulose thickening agent[6] | 0.70 | 0.9 | 0.9 | 0.9 | 0.9 | 0.9 | 0.9 | 0.9 |
| Water | 55.0 | 55.12 | 55.12 | 60.14 | 65.12 | 72.12 | 80.0 | 90.0 |

[1]Magnesium aluminum silicate, "Veegum D", available from R. T. Vanderbilt Co., Inc.
[2]Sorbitan monooleate, "Span 80", available from ICI Americas, Inc.
[3]Polyoxyethylene 20 sorbitan monooleate, "Tween 80", available from ICI Americas, Inc.
[4]DBE-3, a mixture containing 89% dimethyl adipate, 10% dimethyl glutarate, 0.5% dimethyl succinate, 0.1% methanol, available from E. I. du Pont de Nemours and Co.
[5]"Rhodopol 23", available from R. T. Vanderbilt Co., Inc.
[6]Hydroxypropyl methylcellulose, "Methocel K15MS", available from Dow Chemical Co.

The stability of each of the foregoing emulsions was tested by force cooling the emulsion to 15° C. with rapid stirring and by force cooling the emulsion to 30° C. with rapid stirring. The results of these tests are set forth in Table IV.

TABLE IV

| Test | Level of separation of dibasic ester (%) | | | | | | | |
|---|---|---|---|---|---|---|---|---|
| | 8 | 9 | 10 | 11 | 12 | 13 | 14 | 15 |
| Force cooling to 15° C. and rapid stirring | >12 | 12 | 12 | 4 | <1 | 0 | 0 | 0 |
| Force cooling to 30° C. and rapid stirring | >12 | — | 1–3 | 0 | 0 | 0 | 0 | 0 |

From the data in Table IV, it can be seen that when the water content of the emulsion exceeded 70% by weight, there was no separation of dibasic ester under either of the testing conditions; when the water content of the emulsion exceeded 60% by weight but remained below 70% by weight, there was no separation of dibasic ester at 30° C. and only slight separation of dibasic ester at 15° C.; when the water content of the emulsion exceeded 55% by weight but remained below 60% by weight separation of dibasic ester equalled or exceeded 12% at 15° C., but separation of dibasic ester was slight at 30° C. Formulations of stable emulsions containing less than 55% by weight water was difficult.

EXAMPLE 16

The following ingredients in the amounts indicated were used to prepare a composition of this invention.

| Ingredient | Amount (parts by weight) |
|---|---|
| Water | 72.4 |
| Magnesium aluminum silicate ("Veegum D", available from R. T. Vanderbilt Co., Inc.) | 1.1 |
| Sorbitan monooleate ("Span 80", available from ICI Americas, Inc.) | 0.4 |
| Polyoxyethylene 20 sorbitan monooleate ("Tween 80", available from ICI Americas, Inc.) | 0.5 |
| Dibasic ester-3 (DBE-3, available from E. I. du Pont de Nemours and Co.) | 24.1 |
| Hydroxypropyl methylcellulose ("Methocel J75MS", available from Dow Chemical Co.) | 1.0 |
| Xanthan gum ("Kelzan S", available from Kelco, Inc.) | 0.5 |
| Ammonium hydroxide | to adjust pH >7 and <8 |

Water and magnesium aluminum silicate were mixed at room temperature for 30 minutes with a "Dispersator" high shear mixer. Sorbitan monooleate and polyoxyethylene sorbitan monooleate were premixed and then added to the mixture using a lightening mixer for agitation. The dibasic ester was added to the formulation with high agitation. With continued high agitation, hydroxypropylmethylcellulose was added, followed by addition of the xanthan gum. Ammonium hydroxide was then added dropwise until the emulsion had thickened.

The composition was first tested on human skin. It was later found that *a* ground glass plate gave results similar to that of skin. The glass was prepared by placing 240 grit silica carbide between two glass surfaces, adding some water and rubbing the glass plates back and forth. A uniform ground glass surface was obtained that was found to be a suitable substrate for testing. Coatings were applied with a brush to human skin to an area ¾"×2½" and allowed to dry for two hours in air. Coatings were applied to a glass plate with a brush covering an area ¾"×2¾" and allowed to dry for 1 hour at 140° F. The skin cleaner formulation, with the aid of a Buf Puf ® cleaning pad, was then used to attempt to remove each of the coatings.

TABLE V

| Coating to be removed | Time for removal[1] (sec) | |
|---|---|---|
| | Human skin | Ground glass plate |
| Permanent ink | 45[2] | 20[2] |
| Lacquer | 20 | 15 |
| Wood stain | 60[2] | 60[2] |
| Enamel paint | 35 | 45 |
| White latex paint | 40 | 30 |

[1]Percent removal was essentially 100% for time indicated.
[2]Very light stain remained.

A comparison was made of competitive hand cleaning products. Coatings were applied to the ground glass finish and dried for 1 hour at 140° F. If the coating was not completely removed within 1 minute, the study was stopped and the percent removal was recorded. The results are shown in Table IV. N. R. means "not removed".

TABLE VI

| Coating to be removed | Cleansing Creams Tested "TUF ENUF"[1] time (sec) | removal (%) | "GOOP"[2] time (sec) | removal (%) | "GRIT"[3] time (sec) | removal (%) | "GO JO"[4] time (sec) | removal (%) |
|---|---|---|---|---|---|---|---|---|
| Permanent ink | 60 | 75 | 60 | 50 | 60 | 70 | 60 | 50 |
| Lacquer | 60 | N.R. | 60 | N.R. | 60 | 40 | 60 | 40 |
| Wood stain | 60 | 5 | 60 | 5 | 60 | 98 | 60 | N.R. |
| Enamel paint | 60 | N.R. | 60 | N.R. | 60 | 25 | 60 | N.R. |

[1]Available from Critzes Industries, St. Louis, Mo.
[2]Available from Critzes Industries, St. Louis, Mo.
[3]Available from D L Group/Banite Inc., Buffalo, N.Y.
[4]Available from Go Jo Industries, Akron, Ohio The formulation containing the dibasic ester was superior to competitive products tested.

A water based formulation containing 12% dibasic ester also proved effective at cleaning and performed nearly as well as the formulation containing 24% dibasic ester.

The ability of the dibasic ester to be effective at a low concentration in a water based formulation provides a cost savings. Moreover, the water-diluted product would be expected to be safer to use than a product containing a higher concentration of dibasic ester.

In order to increase the speed of the cleaning properties of the composition of this invention, it is helpful to use abrasive action. The use of a nonwoven abrasive such as a Buf Puf ® cleaning pad or a Brushlon ® scrubbing brush can increase the speed of the [cleaning] *cleansing* action of the composition of this invention.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Composition consisting essentially of (1) from about 10 percent by weight to about 45 percent by weight of at least one dibasic ester, (2) from about 55 percent by weight to about 90 percent by weight water, (3) from 0 to 0.9 percent by weight of a surfactant, and (4) at least one thickening agent selected from the group consisting of water soluble and water swellable thickening agents, and mixtures thereof, in an amount sufficient to form a stable emulsion.

2. The composition of claim 1 wherein said water comprises at least 60 percent by weight of said composition.

3. The composition of claim 1 wherein said water comprises at least 70 percent by weight of said composition.

4. The composition of claim 1 wherein said at least one thickening agent comprises from about 0.5 percent by weight to about 4 percent by weight of said composition.

5. The composition of claim 1 wherein said at least one dibasic ester is an aliphatic dibasic ester having a molecular weight equal to or less than about 200.

6. The composition of claim 5 wherein said at least one dibasic ester is a dibasic ester derived from an acid selected from the group consisting of adipic acid, glutaric acid, and succinic acid.

7. Coating removal composition consisting essentially of from about 10 percent by weight to about 45 percent by weight of at least one dibasic ester, from about 55 percent by weight to about 90 percent by weight water, from about 0.5 percent by weight to about 4 percent by weight at least one thickening agent, and from 0 to 0.9 percent by weight surfactant.

8. Coating removal composition consisting essentially of from about 10 percent by weight to about 40 percent by weight of at least one dibasic ester, from about 60 percent by weight to about 90 percent by weight water, from about 0.5 percent by weight to about 4 percent by weight at least one thickening agent, and from 0 to 0.9 percent by weight surfactant.

9. Coating removal composition consisting essentially of from bout 10 percent by weight to about 35 percent by weight of at least one dibasic ester, from about 60 percent by weight to about 90 percent by weight water, from about 0.5 percent by weight to about 4 percent by weight at least one thickening agent, and from 0 to 0.9 percent weight surfactant.

[10. Method of removing an organic coating from a substrate comprising the steps of:

(a) providing a composition consisting essentially of (1) from about 10 percent by weight to about 45 percent by weight of at least one dibasic ester, (2) from about 55 percent by weight to about 90 percent by weight water, and (3) at least one thickening agent selected from the group consisting of water soluble and water swellable thickening agents, and mixtures thereof, in an amount sufficient to form a stable emulsion;

(b) applying said composition to a substrate bearing an organic coating;

(c) allowing said composition to remain on said substrate for a sufficient period of time to loosen said coating; and (d) removing said coating from said substrate.]

[11. The method of claim 10 wherein said substrate is made of wood.]

12. [The] *A* method of [claim 10 wherein said organic coating comprises] *removing a coating of* paint *from a substrate comprising the steps of:*

(*a*) *providing a composition consisting essentially of* (*1*) *from about 10 percent by weight to about 45 percent by weight of at least one dibasic ester,* (*2*) *from about 55 percent by weight to about 90 percent by weight water, and* (*3*) *at least one thickening agent selected from the group consisting of water soluble and water swellable thickening agents, and mixtures thereof, in an amount sufficient to form a stable emulsion;*

(*b*) *applying said composition to a substrate bearing a coating of paint;*

(*c*) *allowing said composition to remain on said substrate for a sufficient period of time to loosen said coating of paint; and*

(*d*) *removing said coating of paint from said substrate.*

13. [The] *A* method of [claim 10 wherein said] *removing an* organic coating [is] selected from the group consisting of varnish, nitrocellulose lacquer, and enamel *from a substrate comprising the steps of:*

(*a*) *providing a composition consisting essentially of* (*1*) *from about 10 percent by weight to about 45 percent by weight of at least one dibasic ester,* (*2*) *from about 55 percent by weight to about 90 percent by weight water, and* (*3*) *at least one thickening agent selected from the group consisting of water soluble and water swellable thickening agents, and mixtures thereof, in an amount sufficient to form a stable emulsion;*

(*b*) *applying said composition to a substrate bearing an organic coating selected from the group consisting of varnish, nitrocellulose lacquer, and enamel;*

(*c*) *allowing said composition to remain on said substrate for a sufficient period of time to loosen said coating; and*

(*d*) *removing said organic coating from said substrate.*

14. The method of claim 13 wherein said varnish is polyurethane varnish.

[15. A thixotropic emulsion composition consisting essentially of:

(1) at least one dibasic ester in an amount sufficient to render organic polymeric coatings removable from surfaces;

(2) water in an amount exceeding 55 percent by weight of the composition; and (3) at least one thickening agent selected from the group consisting of water soluble and water swellable thickening agents in an amount sufficient to form a stable thixotropic emulsion having the ability to cling to vertical surfaces.]

[16. A thixotropic emulsion composition of claim 15 wherein said at least one dibasic ester has a molecular weight of up to about 200.]

[17. A thixotropic emulsion composition of claim 15 wherein said at least one dibasic ester is selected from the group consisting of dibasic esters of adipic acid, glutaric acid, and succinic acid.]

* * * * *